United States Patent [19]
Hashimoto et al.

[11] Patent Number: 5,848,882
[45] Date of Patent: *Dec. 15, 1998

[54] VALVED DISCHARGE MECHANISM OF A FLUID DISPLACEMENT APPARATUS

[75] Inventors: Kenji Hashimoto, Yamada-gun; Atsushi Mabe, Isesaki, both of Japan

[73] Assignee: Sanden Corporation, Gunma, Japan

[*] Notice: The term of this patent shall not extend beyond the expiration date of Pat. No. 5,647,395.

[21] Appl. No.: 848,183

[22] Filed: Apr. 29, 1997

Related U.S. Application Data

[63] Continuation of Ser. No. 584,362, Jan. 11, 1996, Pat. No. 5,647,395.

[30] Foreign Application Priority Data

Jan. 13, 1995 [JP] Japan ................................ 7-21345

[51] Int. Cl.$^6$ ............................................ F04B 39/10
[52] U.S. Cl. .................................... 417/569; 137/856
[58] Field of Search ............................. 417/569, 571, 417/269; 137/855, 856, 857, 514, 517

[56] References Cited

U.S. PATENT DOCUMENTS

| | | | |
|---|---|---|---|
| 2,065,062 | 12/1936 | Dugelay . | |
| 3,939,867 | 2/1976 | Lundrik et al. | 137/514 |
| 4,179,883 | 12/1979 | Nishiyama et al. | 137/856 |
| 4,230,149 | 10/1980 | Worthen et al. | 137/517 |
| 4,377,968 | 3/1983 | Gerry | 137/521 |
| 4,628,963 | 12/1986 | Ishijima et al. | 137/857 |
| 4,642,037 | 2/1987 | Fritchman | 417/571 |
| 4,759,696 | 7/1988 | Ishiai | 137/521 |
| 4,836,754 | 6/1989 | Ikeda et al. | 417/269 |
| 5,242,276 | 9/1993 | Shimizu | 137/856 |
| 5,370,156 | 12/1994 | Peracchio et al. | 137/856 |
| 5,380,176 | 1/1995 | Kikuchi et al. | 137/856 |
| 5,586,874 | 12/1996 | Hashimoto et al. | 137/856 |
| 5,632,609 | 5/1997 | Hashimoto | 417/571 |

FOREIGN PATENT DOCUMENTS

| | | |
|---|---|---|
| 4119731 | 1/1992 | Germany . |
| 3244003 | 5/1994 | Germany . |

*Primary Examiner*—Charles G. Freay
*Attorney, Agent, or Firm*—Baker & Botts, L.L.P.

[57] ABSTRACT

A discharge valve assembly for use in a fluid displacement apparatus has a suction chamber and a discharge chamber on one side of a valve plate, a compression chamber on the other side of the valve plate and a passage formed in the valve plate extending between the compression chamber and the discharge chamber. The discharge valve assembly comprises a valve limiting device secured to the valve plate for limiting the bending movement of a valve member. The valve member is bent away from the valve plate when all external pressure influences are removed. Noise and vibration caused by the striking of the valve member against the valve seat and the retainer member are thereby decreased.

4 Claims, 6 Drawing Sheets

VALVED DISCHARGE MECHANISM OF A FLUID DISPLACEMENT APPARATUS

This application is a continuation of application Ser. No. 08/584,362, filed Jan. 11, 1996, now U.S. Pat. No. 5,647,395, entitled "VALVED DISCHARGE MECHANISM OF A FLUID DISPLACEMENT APPARATUS".

BACKGROUND OF THE INVENTION

1. Field of the Invention

The present invention relates to a valved discharge mechanism of a fluid displacement apparatus, and more particularly, to a valved discharge mechanism of a refrigerant compressor used in an automotive air conditioning system.

2. Description of the Prior Art

Valved discharge mechanisms of refrigerant compressors are well known in the prior art. For example, FIG. 1 depicts a suction port mechanism used in a refrigerant compressor according to the prior art. As disclosed therein, the refrigerant compressor includes a compressor housing defining a compression chamber in which successive strokes of intake, compressing, and discharge of a refrigerant gas are repeatedly performed. Further, the compressor includes valve plate 25, which partitions the compression chamber and the discharge chamber, and a discharge valve assembly, which is mounted on an end surface of valve plate 25. Valve plate 25 has a discharge hole 252 extending therethrough to allow communication of the compression chamber with the discharge chamber. The discharge valve assembly includes discharge valve 81 and valve retainer 80, which are secured to end surface 25a of valve plate 25 by bolt 82. Discharge reed valve 81, which is made of an elastic material, regulates the flows of the refrigerant gas and sealingly engages end surface 25a of valve plate 25 when the operation of the compressor is stopped.

Valve retainer 80 limits the bending movement of discharge reed valve 81 in the direction in which the refrigerant gas exits the compression chamber and enters the discharge chamber through discharge hole 252. Discharge reed valve 81 has an elastic modulus which keeps discharge hole 252 closed until the pressure in the compression chamber reaches a predetermined value. Discharge reed valve 81 strikes valve retainer 80 when it opens, and strikes end surface 25a of valve plate 25 when it closes. This striking generates vibration and noises during operation of the compressor. Vibration caused by reed valve 81 striking end surface 25a of valve plate 25 is readily transmitted to the compressor housing.

One solution attempted by the assignor of the present application is depicted in FIG. 2. Though not prior art, this attempt is illustrative of progress in this area. There, valve plate 25 includes recessed portion 350 formed so that its depth increases with distance from point B, which is located on valve plate 25 and is spaced a distance L from bolt 82. Recessed portion 350 includes curved surface 351 surrounding discharge hole 352. When discharge reed valve 81 is in its closed position, it sealingly engages curved surface 351. Curved surface 351 has a radius of curvature R1, which defines the closing deformation of discharge reed valve 81.

Further, valve retainer 80 includes curved surface 80a having radius of curvature R2, which defines the opening deformation of discharge reed valve 81. Radius of curvature R1 is designed to be equal to or less than radius of curvature R2 so that when discharge reed valve 81 closes, its elastic restoring force will not cause it to strike end surface 25a of valve plate 25 with significant force. Curved surface 80a of valve retainer 80 begins curving away from valve plate 25 at point A, which is also spaced a distance L from bolt 82.

The impact force with which discharge reed valve 81 strikes curved surface 351 of valve plate 25 in FIG. 2 is smaller than that which discharge reed valve 81 strikes end surface 25a of valve plate 25 in FIG. 1. While noise and vibration caused by discharge reed valve 81 are reduced in comparison with the arrangement of FIG. 1, the closing of discharge reed valve is delayed in comparison with FIG. 1 due to recessed portion 350. As a result, volumetric efficiency of the compressor is decreased.

SUMMARY OF THE INVENTION

It is an object of the present invention to provide a fluid displacement apparatus for use in an automotive air conditioning system having a valved discharge mechanism which can effectively reduce the vibration noise emitting from a discharge valve assembly and thus, reduce the propagation of offensive noise to the passenger compartment of a vehicle.

It is a further object of the present invention to provide a fluid displacement apparatus wherein volumetric efficiency is improved.

According to the present invention, a discharge valve assembly for use in a fluid displacement apparatus has a suction chamber and a discharge chamber on one side of a valve plate, a compression chamber on the other side of the valve plate and a passage formed in the valve plate extending between the compression chamber and the discharge chamber. The passage has an open end through which discharge fluid flows. The discharge valve assembly has a limiting device secured to the valve plate for limiting the bending movement of a valve member. The valve member is disposed on the valve plate and has a spring constant causing the passage to remain blocked until the pressure in the compression chamber reaches a predetermined value. The valve member naturally bends away from the valve plate when external pressure influences are removed.

Further objects, features and other aspects of the present invention will be understood from the detailed description of the preferred embodiments of the present invention with reference to the annexed drawings.

DETAILED DESCRIPTION OF THE PREFERRED EMBODIMENTS

Figure 3:
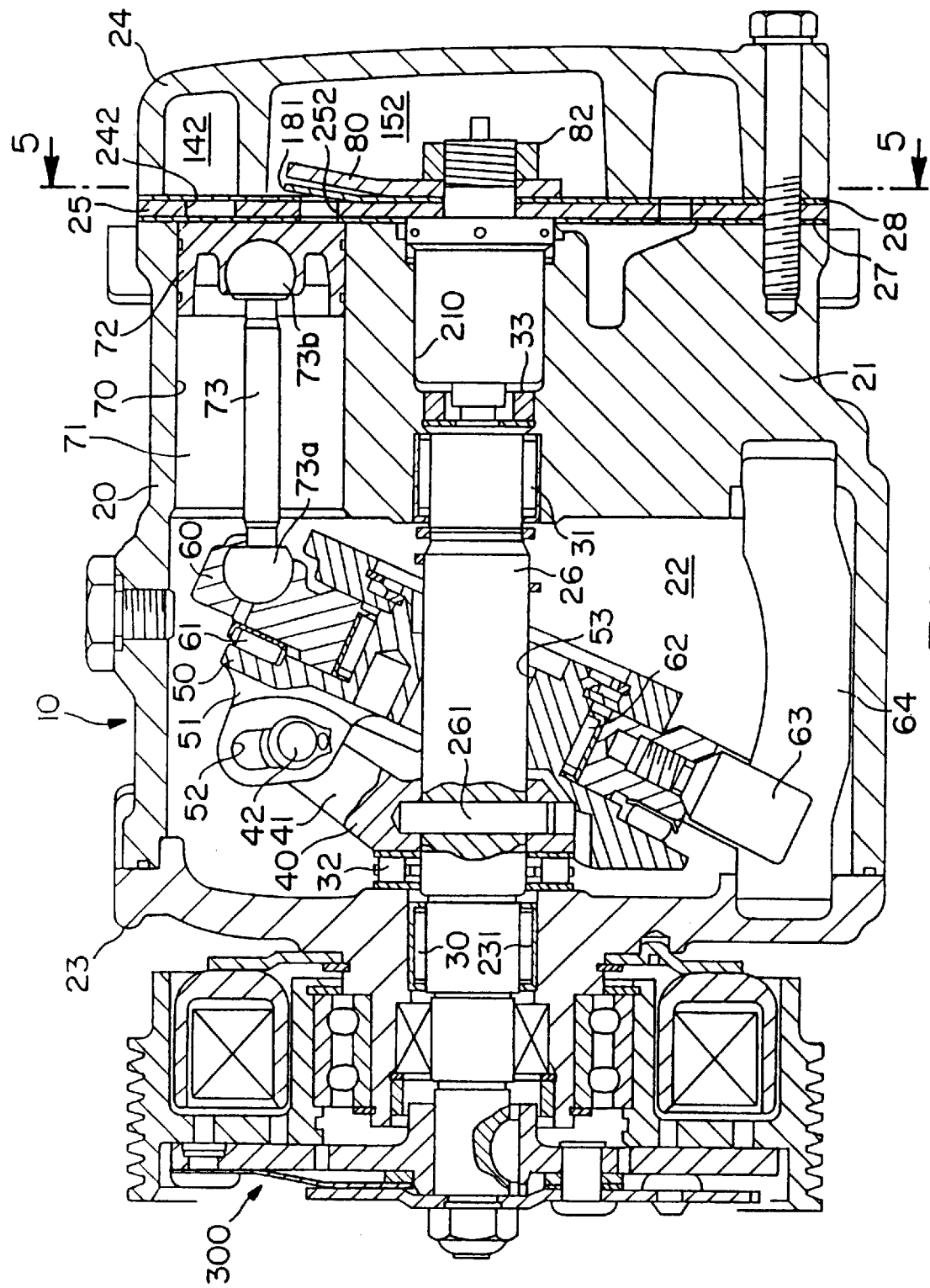
FIG. 3 is a longitudinal sectional view of a slant plate type refrigerant compressor in accordance with a first preferred embodiment of the present invention.

With reference to FIG. 3, a fluid displacement apparatus in accordance with the present invention is shown. The fluid displacement apparatus is described in terms of a piston type compressor, but it will be readily appreciated by those skilled in the art that the invention could be adapted to other fluid displacement apparatuses.

The compressor comprises cylindrical housing assembly 20 including cylinder block 21, crank chamber 22, front end plate 23, rear end plate 24, and valve plate 25. Crank chamber 22 is formed between cylinder block 21 and front end plate 23. Front end plate 23 is mounted on one end of cylinder block 21 by a plurality of bolts (not shown). Rear end plate 24 is mounted on the opposite end of cylinder block 21 by a plurality of bolts 241. Valve plate 25 is located between rear end plate 24 and cylinder block 21.

Opening 231 is centrally formed in front end plate 23 and supports drive shaft 26 through bearing 30 disposed in opening 231. The inner end portion of drive shaft 26 is rotatably supported by bearing 31, which is disposed within a center bore 210 of cylinder block 21. Bore 210 extends to a rearward end surface of cylinder block 21, wherein there is disposed valve control mechanism 212.

Cam rotor 40 is fixed on drive shaft 26 by pin member 261 and rotates with drive shaft 26. Thrust needle bearing 32 is disposed between the inner end surface of front end plate 23 and the adjacent axial end surface of cam rotor 40. Cam rotor 40 includes arm 41 having pin member 42 extending therefrom. Slant plate 50 is adjacent cam rotor 40 and includes opening 53 through which passes drive shaft 26. Slant plate 50 includes arm 51 having slot 52 formed therein. Cam rotor 40 and slant plate 50 are connected by pin member. 42. Slot 52 allows adjustment of the angular position of slant plate 50 with respect to the longitudinal axis of drive shaft 26.

Wobble plate 60 is nutatably mounted on slant plate 50 through bearings 61 and 62. Fork-shaped slider 63 is attached to the outer peripheral end of wobble plate 60 and is slidably mounted on rail 64 held between front end plate 23 and cylinder block 21. Fork-shaped slider 63 prevents rotation of wobble plate 60, and slides along rail 64 when cam rotor 40 rotates. Cylinder block 21 includes a plurality of peripherally located cylinder chambers 70 in which pistons 72 reciprocate. Each piston 72 is connected to wobble plate 60 by a corresponding connecting rod 73.

Rear end plate 24 includes peripherally located annular suction chamber 142 and centrally located discharge chamber 152. Valve plate 25 is located between cylinder block 21 and rear end plate 24 and includes a plurality of valved suction holes 242 linking suction chamber 142 with cylinder chambers 70. Valve plate 25 also includes a plurality of valved discharge holes 252 linking discharge chamber 152 with cylinder chambers 70.

Suction chamber 142 includes an inlet port, which is connected to an evaporator of the external cooling circuit (not shown). Discharge chamber 152 is provided with an outlet port which is connected to a condenser of the cooling circuit (not shown). Gaskets 27 and 28 seal the mating surfaces of cylinder block 21, valve plate 25 and rear end plate 24.

Disk-shaped adjusting screw member 33 is disposed in a central region of bore 210 between the inner end portion of drive shaft 26 and valve control mechanism 212. Disk-shaped adjusting screw member 33 is screwed into bore 210 so that it contacts the inner end surface of drive shaft 26 through washer 214, and permits adjustment of the axial position of drive shaft 26. Piston assembly 71 includes connecting rod 73, which includes a pair of ball portions 73a and 73b formed at both ends thereof and cylindrically-shaped piston 72, which is connected to ball portion 73b.

Figure 4:
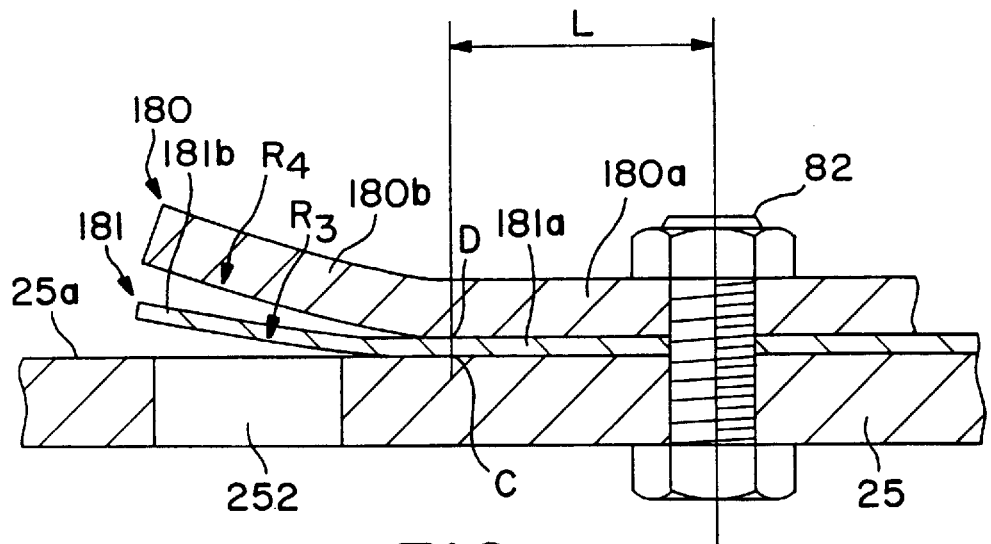
FIG. 4 is an enlarged partial sectional view of a discharge valve assembly in accordance with the first preferred embodiment of the present invention.
Figure 5:
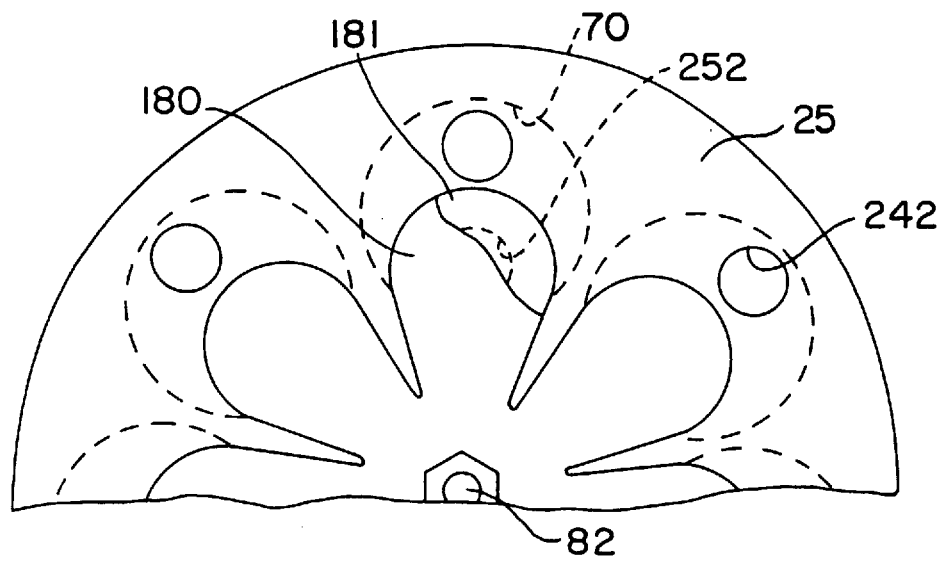
FIG. 5 is a partial cross sectional view of the discharge valve assembly taken along line 5—5 of FIG. 3.

Referring to FIGS. 4 and 5, the discharge valve assembly according to the first preferred embodiment includes discharge reed valve 181 and valve retainer 180 which are secured to valve plate 25 by bolt 82. Discharge reed valve 181, which is made of an elastic member, e.g., thin spring steel, regulates the flow of the refrigerant gas. Discharge reed valve 181 has a substantially flat portion 181a formed to the side of bolt 82 and sealing portion 181b extending from flat portion 181a. When discharge reed valve 181 is in its natural state, i.e., without the influence of fluid pressure, sealing portion 181b naturally bends towards valve retainer 180. Sealing portion 181b thus has a radius of curvature R3 passing through point C, which is spaced a distance L from bolt 82.

Valve retainer 180 includes two portions as well. Flat portion 180a passes through point D, which is spaced a distance L from bolt 82. Curved portion 180b has a curved cross section passing through point D and has a radius of curvature R4. Valve retainer 180 is preferably made of resin or engineering plastic, e.g., polyacetal resin. Valve retainer 180 limits the bending movement of discharge reed valve 181 in the direction that refrigerant gas exits discharge hole 252. Discharge reed valve 181 bends as it opens and closes discharge hole 252, and has a spring constant which allows discharge reed valve 181 to block discharge hole 252 until the pressure in cylinder chamber 70 reaches a predetermined value. The relationship of R3 and R4 is such that R4<R3.

During operation of the fluid displacement apparatus, drive shaft 26 is rotated by the vehicle's engine through electromagnetic clutch 300. Cam rotor 40 is driven by drive shaft 26, which rotates slant plate 50 as well, which in turn causes wobble plate 60 to nutate. Nutational motion of wobble plate 60 reciprocates pistons 72 in their respective cylinders 70. As pistons 72 are reciprocated, refrigerant gas, which is introduced into suction chamber 142 through the inlet port, is then compressed. The compressed refrigerant gas is discharged to discharge chamber 152 from each cylinder chamber 70 through discharge holes 252, and into the cooling circuit through the outlet port.

Figure 1:
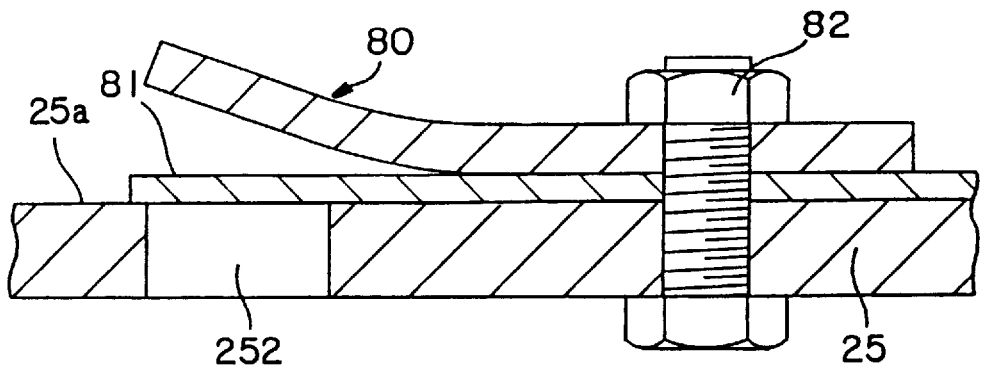
FIG. 1 is an enlarged partial sectional view of a discharge valve assembly in accordance with the prior art.
Figure 2:
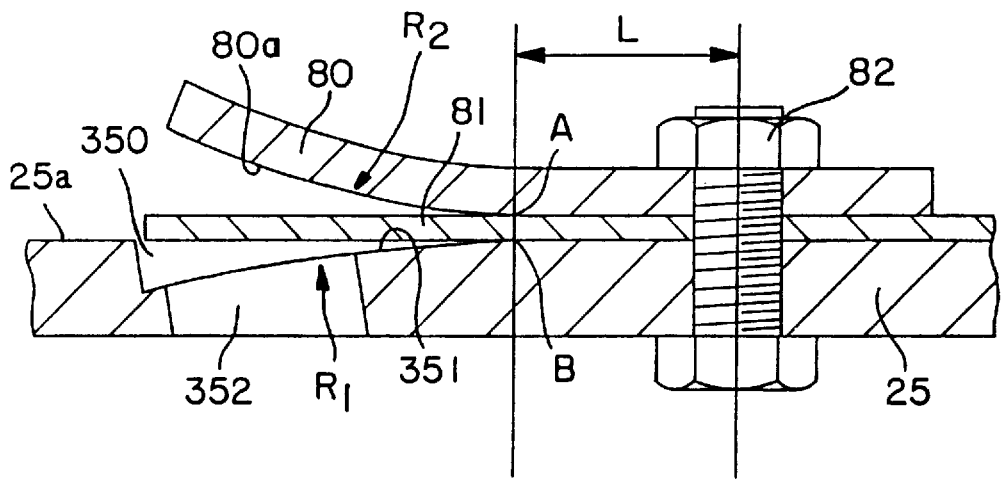
FIG. 2 is an enlarged partial sectional view of another discharge valve assembly.

The impact force with which discharge reed valve 181 strikes end surface 25a of valve plate 25 in the preferred embodiment is smaller than that which discharge reed valve 81 strikes end surface 25a of valve plate 25 in the arrangement of FIG. 1. In the case of FIG. 4, discharge reed valve 181 more readily resists bending toward end surface 25a of valve plate 25, whereas discharge reed valve 81 in the configuration of FIG. 1 more readily bends towards valve retainer 80. Consequently, when the pressure differential between cylinder chamber 70 and discharge chamber 152 forces discharge reed valve 181 to bend toward end surface 25a of valve plate 25, discharge reed valve 181 is influenced by its elastic restoring force and a smaller impact against end surface 25a of valve plate 25 results. As a consequence, noise and vibration caused by discharge reed valve 181 striking end surface 25a of valve plate 25 decreases.

Figure 6:
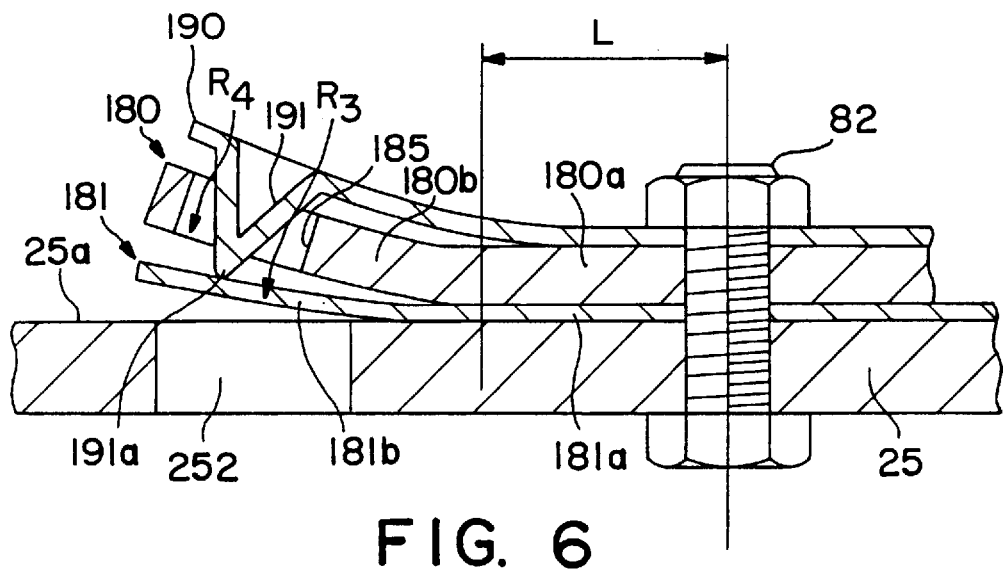
FIG. 6 is an enlarged partial sectional view of a discharge valve assembly in accordance with a second preferred embodiment of the present invention.
Figure 7:
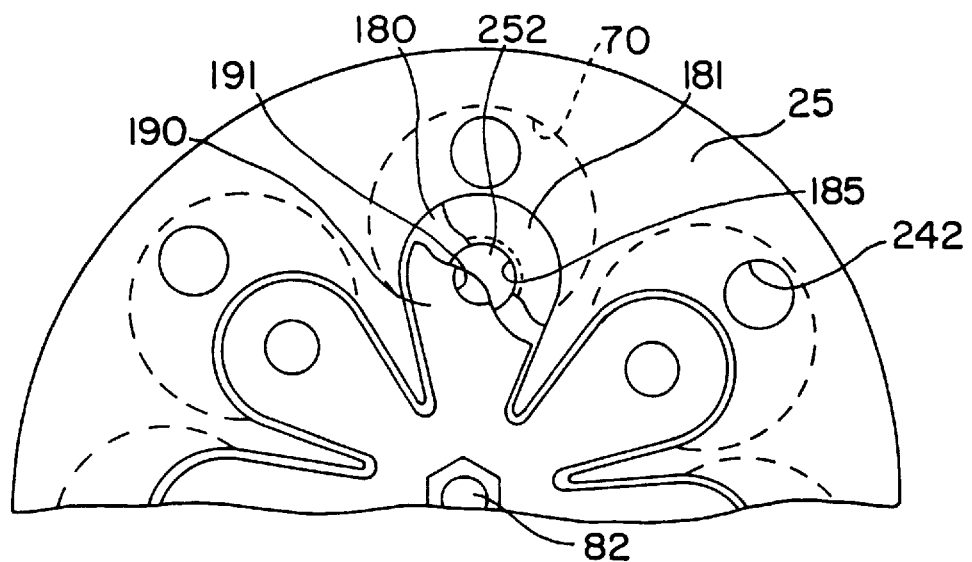
FIG. 7 is a partial cross section view of the discharge valve assembly of FIG. 6 taken along a section line similar to line 5—5 of FIG. 3.

FIGS. 6 and 7 illustrate a second preferred embodiment of the present invention. Elements in FIG. 6 similar to those in FIG. 4 are designated with the same reference numerals. Valve retainer 180 includes hole 185 formed therein. Spring plate 190, which is made of an elastic material such as thin steel, is secured to bolt 82 and located on valve retainer 180 opposite the side of valve retainer 180 on which discharge valve 181 is located. Spring plate 190 includes projection portion 191 penetrating through hole 185 of retainer 180. Projection portion 191 is conically shaped and formed by a press working process. End portion 191a of projection portion 191 contacts discharge valve 181 when all external pressure influences are removed. The contact point is preferably positioned to the left of the center of discharge hole 252. Alternatively, the contact point could be positioned at the center of discharge hole 252.

Figure 8:
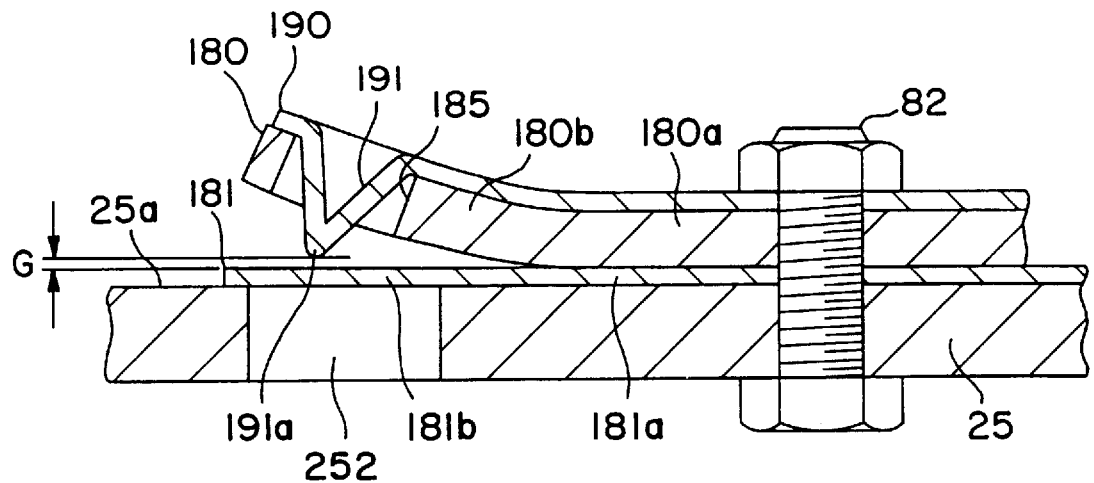
FIG. 8 is an enlarged partial sectional view of the discharge valve assembly of FIG. 6 shown in a closed position.
Figure 9:
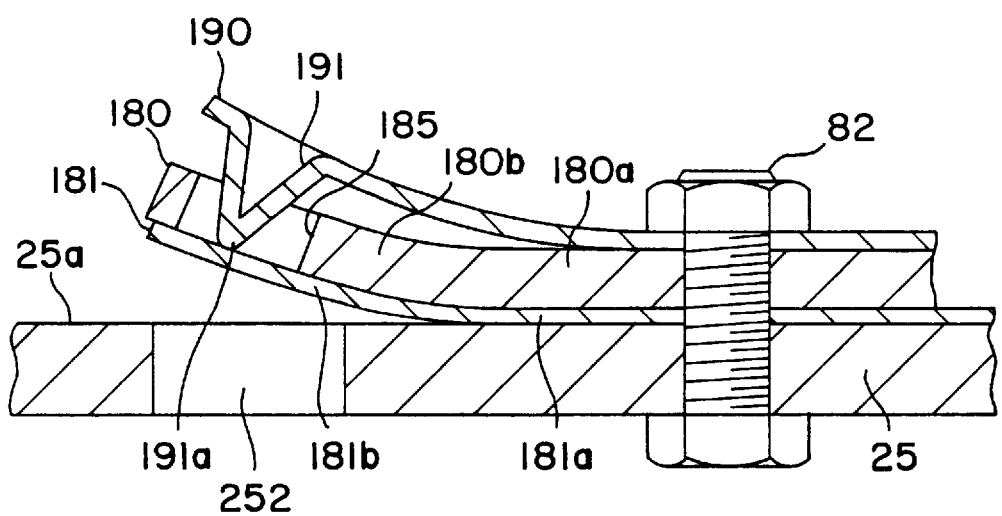
FIG. 9 is an enlarged partial sectional view of the discharge valve assembly of FIG. 6 shown in an open position.

FIG. 8 illustrates the discharge valve assembly of the second embodiment wherein discharge reed valve 181 closes to fully block discharge hole 252. A gap G is formed between end portion 191a of projection 191 and discharge reed valve 181. FIG. 9 illustrates the discharge valve assembly of the second embodiment wherein discharge reed valve 181 is fully opened. Discharge reed valve 181 overcomes the biasing force of spring plate 190 and contacts valve retainer 180.

Substantially the same advantages as those in the first preferred embodiment are realized in the second preferred embodiment. Moreover, in the second preferred embodiment, discharge reed valve 181 quickly returns to end surface 25a of valve plate 25 at the beginning of the suction stage since projection portion 191 of spring plate 190 pushes discharge reed valve 181 just before discharge reed valve 181 closes. This improvement reduces the delay of closing discharge reed valve 181. Volumetric efficiency of the compressor therefore increases. Generally, volumetric efficiency is defined by a ratio of theoretical piston displacement volume to actual piston displacement volume.

Furthermore, the impact force with which discharge reed valve 181 strikes valve retainer 180 is smaller than that which discharge reed valve 81 strikes valve retainer 80 in the arrangement of FIG. 1. This is due to discharge reed valve 181 being subjected to the spring back force of spring plate 190 when the pressure differential between compression chamber 70 and discharge chamber 152 forces discharge valve 181 to bend toward valve retainer 180. Therefore, noise and vibration caused by discharge reed valve 181 striking end surface 25a of valve plate 25 and valve retainer 180 decreases.

Figure 10:
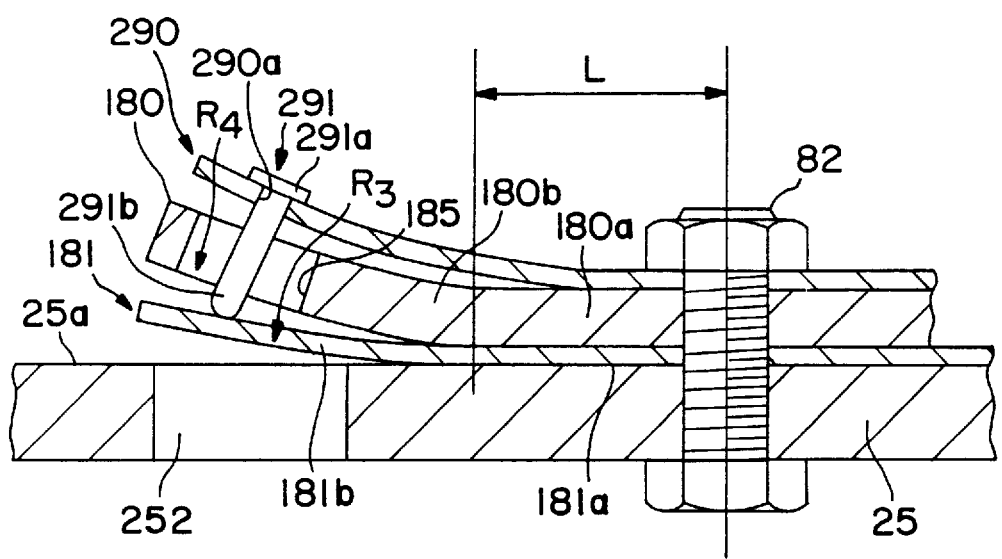
FIG. 10 is an enlarged partial sectional view of a discharge valve assembly in accordance with a third preferred embodiment of the present invention.

FIG. 10 illustrates a third preferred embodiment of the present invention. Elements in FIG. 10 similar to those in FIG. 6 are designated with the same reference numerals. Spring plate 290, which is made of an elastic material such as thin steel, is secured to bolt 82 and located on valve retainer 180 opposite the side of valve retainer 180 on which discharge valve 181 is located. Spring plate 290 includes hole 290a therein. Rivet member 291 is secured to spring plate 290 and penetrates through hole 290a. Rivet member 291 protrudes from hole 185 of valve retainer 180, and end portion 291b of rivet member 291 contacts discharge reed valve 181 when all external pressure influences are removed. The contact point between rivet member 291 and discharge reed valve 181 is preferably positioned to the left of center of discharge hole 252 or alternatively, at the center of discharge hole 252. Substantially the same advantages as those in the second preferred embodiment are realized in the third preferred embodiment.

Although the present invention has been described in connection with the preferred embodiments, the invention is not limited thereto. It will be easily understood by those of ordinary skill in the art that variations and modifications may be made within the scope of this invention as defined by the appended claims. Thus, while the preferred embodiments illustrate the invention in a particular type of fluid displacement apparatus, i.e., a slant plate type compressor, the invention could be used in any other type of fluid displacement apparatus, such as a scroll type fluid displacement apparatus.

We claim:

1. A discharge valve assembly for use in a fluid displacement apparatus having a suction chamber and a discharge chamber on one side of a valve plate, a compression chamber on the other side of said valve plate, and a passage formed in said valve plate extending between said compression chamber and said discharge chamber, said passage having an open end through which discharge fluid flows, said assembly comprising:

a valve limiting means secured to said valve plate for limiting bending movement of a valve member; wherein said valve member is disposed on said valve plate and has a spring constant causing said passage to remain blocked until pressure in said compression chamber reaches a predetermined value, said valve member having a flat portion spaced apart from the passage and a curved portion extending from the flat portion and extending entirely across the passage and being bent away from said valve plate so as to reside throughout its extent in an intermediate position between said valve limiting means and said valve plate in the absence of any pressure differential between said compression and discharge chambers.

2. The discharge valve assembly of claim 1, wherein said valve limiting means includes a valve retainer member bent away from said valve plate.

3. The discharge valve assembly of claim 2, wherein said valve retainer member has a first radius of curvature and said valve member has a second radius of curvature, said first radius of curvature smaller than said second radius of curvature.

4. The discharge valve assembly of claim 2, wherein said valve limiting means further comprises means disposed on said valve retainer member for controlling movement of said valve member.

* * * * *